United States Patent [19]

Mischenko et al.

[11] 4,421,072

[45] Dec. 20, 1983

[54] METHOD OF FEEDING CARBURETOR INTERNAL COMBUSTION ENGINE

[76] Inventors: Anatoly I. Mischenko, ulitsa Lermontovskaya, 14/16, kv. 37; Gennady B. Talda, prospekt Gagarina, 38, kv. 89; Alexandr V. Belogub, Saltovskoe shosse, 250-a, kv. 468; Anatoly N. Podgorny, ulitsa Sumskaya, 118, kv. 14; Alexandr A. Makarov, ulitsa Bairona, 146, kv. 71; Anatoly T. Zhemerenko, ulitsa 2 Pyatiletki, 1b, kv. 81; Anatoly I. Domrachev, Saltovskoe shosse, 141b, kv. 36; Petr K. Efremov, ulitsa Geroev Truda, 17, kv. 23, all of Kharkov, U.S.S.R.

[21] Appl. No.: 336,018

[22] Filed: Dec. 30, 1981

[51] Int. Cl.$^3$ ............................ F02B 75/12; F02B 7/02
[52] U.S. Cl. ........................... 123/1 A; 123/DIG. 12; 123/577
[58] Field of Search ............. 123/1 A, DIG. 12, 577, 123/575

[56] References Cited

U.S. PATENT DOCUMENTS 3,939,806 2/1976 Bradley ..................... 123/DIG. 12

FOREIGN PATENT DOCUMENTS 821725 4/1981 U.S.S.R. ..................... 123/DIG. 12

OTHER PUBLICATIONS

"Houseman et al., On-Board Hydrogen Generator for a Partial Hydrogen Injection Internal Combustion Engine".

Primary Examiner—Charles J. Myhre
Assistant Examiner—E. Rollins Cross
Attorney, Agent, or Firm—Murray Schaffer

[57] ABSTRACT

In accordance with the proposed method the combustible mixture fed to the engine is formed from a petrol-air flow and a hydrogen-air flow. Depending on the load on the engine shaft the composition of the combustible mixture is controlled by varying the amount and composition of said mixtures in said flows so that at full load the resulting combustible mixture contains (by weight) from 5.8 to 6.0% of petrol, from 0.14 to 0.17% of hydrogen, and from 93.7 to 94.0% of air, and a load constituting 0.1 of the full load, said mixture contains from 1.2 to 1.5% of petrol, from 0.42 to 0.45% of hydrogen, and from 98.1 to 98.4% of air. There are also given the quantities of the components in said combustible mixture for other load conditions.

1 Claim, 19 Drawing Figures

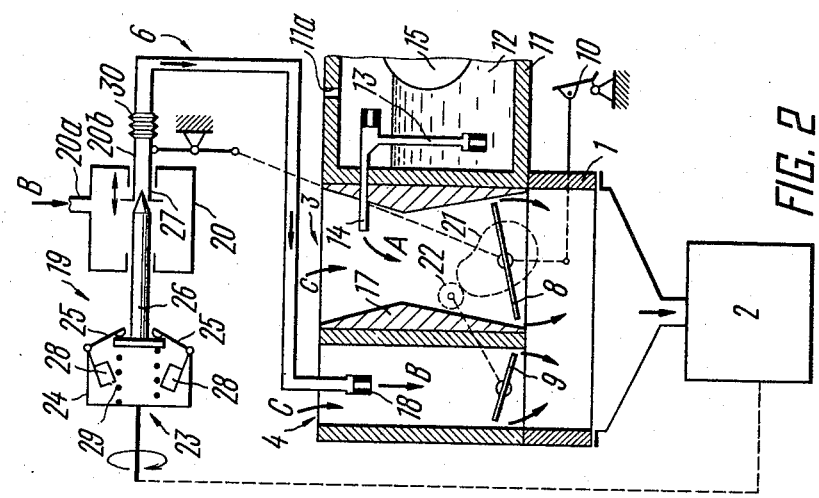
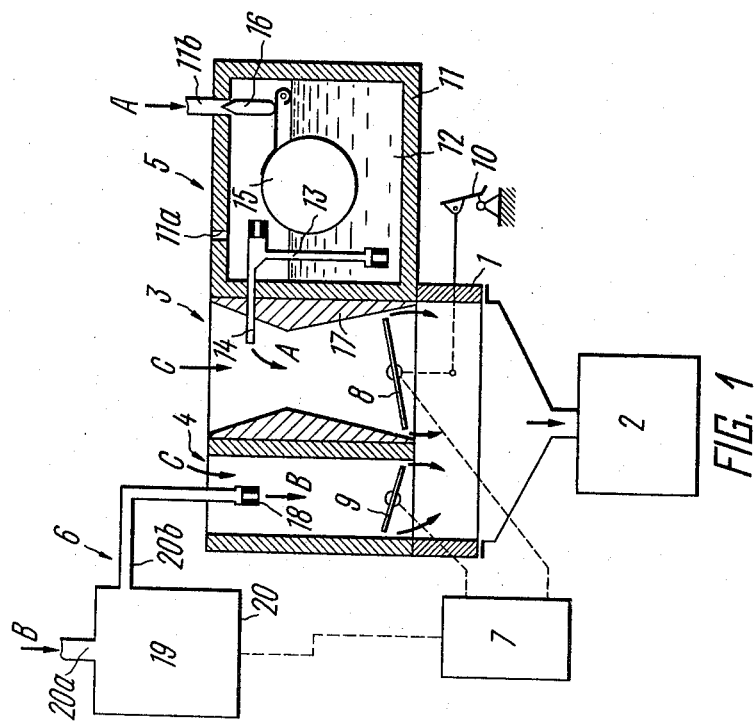
FIG. 1
FIG. 2

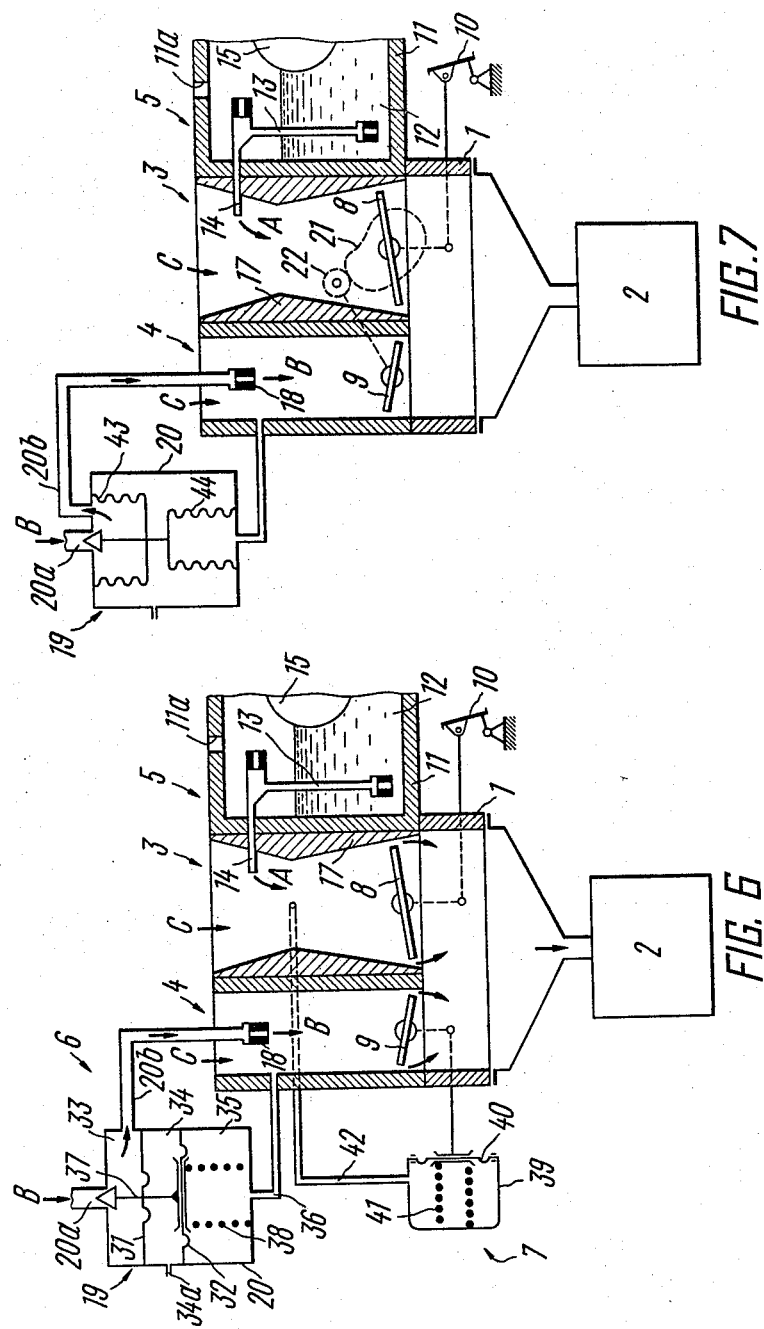

METHOD OF FEEDING CARBURETOR INTERNAL COMBUSTION ENGINE

BACKGROUND OF THE INVENTION

1. Field of the Invention

The present invention relates to engine manufacturing, and more specifically, is concerned with a method of feeding carburetter engines and a carburetter for carrying out the same.

The invention may be used everywhere where internal combustion engines with carburation having an external ignition source are employed, in particular, on transport vehicles such as, for instance, motor cars.

2. Prior Art

Saving of hydrocarbon fuel and environment protection to prevent exhaust product pollution of the environment are the most urgent problem throughout the world. The main consumers of the hydrocarbon fuel are motor-car engines which are at the same time the main sources of atmospheric pollution. Therefore, decreasing the specific consumption of fuel in internal combustion engines, developing and using new types of fuel and reducing the toxicity of exhaust gases are of paramount importance in solving the above problems.

Transport vehicles powered with carburetter engines are most extensively used at present, since these engines are characterized by a high specific power and good dynamic characteristics, and in addition they are not expensive.

Main disadvantages these engines have are a high fuel specific consumption (210–270 g-equ hp per hour) and a high content of toxic substances in the exhaust products. This is caused by that at a low and mean loads on a shaft of the engine the latter has to operate on a combustible mixture, in particular on a petrol-air mixture, having an excess-air coefficient (hereinafter referred to as "$\alpha$") lower than 1. For instance, in the case of no-load (idle) running (at a minimum load on a shaft) the coefficient $\alpha$ must be equal to 0.6 and at a maximum load it must be in the range from 0.85 to 0.95. In the latter case the combustion velocity of the petrol-air mixture is maximum. In this case, however, a portion of the fuel does not burn and is carried away by the exhaust gases in the form of a carbon oxide or non-oxidized hydrocarbons.

With the increase of the coefficient $\alpha$ the combustion velocity decreases, which results in a lower engine power output. In this case if $\alpha > 1.3$ said petrol-air mixture generally cannot be ignited in a combustion chamber, since it is a well known fact that said mixture may be ignited only provided that $0.6 < \alpha < 1.3$. This leads to that regulating the operating conditions of the engine can be effected only by varying the quantity of the combustible mixture through its throttling at the entrance to the engine by means of a choke valve. Such throttling, however, at a low and a mean loads, in which case the coefficient of filling of the cylinders is from 0.1 for a no-load running to 0.4–0.5 at mean loads, leads to the increase of the fuel specific consumption.

The problem of fuel saving and of decreasing the toxicity of the exhaust gases may be partially solved by replacing the carburetter engines with diesel engines, which is done in fact in most countries. A diesel engine features a lower fuel specific consumption (155–190 g-equ hp per hour) but because of its complex fuel-feed equipment and the use of expensive wear resistant materials it is 1.5–2 times more expensive than a comparable carburetter engine. Furthermore, the specific power of a diesel engine is generally 0.2–0.4 hp per kg, which is 1.5–3 times lower than that of carburetter engines. It is also to be noted that diesel engines have lower dynamic characteristics and relatively a higher content of nitrogen oxides and soot in the exhaust gases.

Therefore, a more simple way of reducing the fuel specific consumption and the exhaust gases toxicity is to improve the carburetter engine, and in particular to develop a new method of feeding carburetter engines and improve the carburetters.

An economical operation of engine may be considerably improved with a simultaneous decrease in the toxicity of the exhaust gases by using hydrogen as an additive to hydrocarbon fuel (petrol), that is by forming a combustible mixture from three components namely, petrol, hydrogen and air.

In the description of the invention relating to a carburetter which has been proposed by us earlier (cf. USSR Author's Certificate No. 670,739, Int.Cl$^2$ F02M25/10) is also disclosed a method of feeding carburetter engines, wherein the combustible mixture is formed from a petrol-air mixture and a hydrogen-air mixture and then fed to the engine with the proportions of the components in said mixture being regulated depending on the load on the engine shaft. This control is effected by varying the quantity of the petrol-air mixture and the quantity of and component proportions in the hydrogen-air mixture. However, the quantities of the components contained in the combustible mixture being formed ae not specified; there are given only air-excess coefficients $\alpha$. Thus, for idle running $\alpha = 4.5$ and at a full load $\alpha = 1$.

A carburetter (see the above-mentioned Author's Certificate) to practice this method of feeding an engine comprises a mixing tube connected to the intake manifold of the engine, a first and a second choke tubes for forming a petrol-air mixture and a hydrogen-air mixture, both communicating with said mixing tube, as well as a petrol supply and a hydrogen supply units. The first choke chamber has a choke valve to control the quantity of the petrol-air mixture in the resultant combustible mixture. The petrol supply unit comprises a float chamber and a main dosage chamber communicating said float chamber with the first choke tube. The hydrogen supply unit comprises an injector fitted into the second choke tube and a hydrogen-feed regulator. The said regulator has a body provided with an inlet pipe to intake hydrogen and an outlet pipe to feed hydrogen to the injector, for which purpose said inlet pipe is connected to said injector. This regulator also includes a working member disposed in said body and intended to regulate the quantity of the hydrogen fed to said injector.

It has been established that a higher efficiency of the above method of feeding a three-component combustible mixture to an internal combustion engine as compared to the prior art method of feeding a two-component mixture (petrol-air-mixture) to an engine of a similar type, is explained by that the combustion velocity of a combustible mixture composed from petrol, hydrogen and air, in which mixture the amount of hydrogen is from 1 to 15% of the total amount of the hydrogen and petrol and the coefficient $\alpha$ is equal to from 1 to 1.15, corresponds to the burning velocity of a petrol-air mixture (without hydrogen) whose coefficient $\alpha$ is equal to from 0.85 to 0.95, that is to the maximum combustion velocity in an engine operating on a two-component combustible mixture. Also, in this case the engine power output obtained will be equal to that obtained in the case of feeding to the engine a two-component combustible mixture with $\alpha>1$, which in the end leads to a higher efficiency of the engine.

Further leaning of the combustible mixture above $\alpha=1.3$, the stability of its burning due to the presence of the hydrogen is not disturbed even at $\alpha 32\ 7$. In this case when $\alpha$ is increased from 1 to 7 the hydrogen content in the combustible mixture increases and at a maximum value of $\alpha$ reaches 100%.

In this method, therefore, at low an mean loads (beginning from idle running to loads constituting 0.4–0.6 of the full load) the engine is fed with a lean mixture. Thus in the case of idle running the coefficient $\alpha$ is 4.5–7, and at mean loads said coefficient is 1.8–2.2. This to a certain extent improves the efficiency of the engine and decreases the exhaust gases toxicity.

It should be noted, however, that in practising the above method with the use of said carburetter there are experienced a number of difficulties. First, even with the use of such a relatively efficient method the efficiency of the engine at low and mean loads remains relatively low, which perhaps may be explained by a considerable loss of heat through exhaust gases.

Furthermore, at $\alpha=4.5-7$ the engine can operate only with large (50°–70°) angles of advance, which requires more complex ignition system. In addition, at a minimum no-load running speeds there occurs a relatively high consumption of the hydrogen (for the engines with the displacement volume of 2500 cu cm it constitutes not less than 0.2–0.3 kg per hr). It should also be noted that any attempt to increase the efficiency of the engine employing the prior art method inevitably leads to the increase in the exhaust gases toxicity.

SUMMARY OF THE INVENTION

The principal object of the invention is to provide a method of feeding a carburetter internal combustion engine and a carburetter for carrying out the same, which allow the engine efficiency to be improved in the whole load range and to thereby reduce the fuel consumption, simultaneously decreasing to a minimum the exhaust gases toxicity.

Another not less important object of the invention is to provide a carburetter which while carrying out said method allows the formation of a uniform combustible mixture, thus providing for a better conbustion thereof.

Still another object of the invention is to provide a carburetter which ensures an efficient operation of the engine even when the hydrogen pressure at the entrance to the carburetter drops.

Yet another object of the invention is to provide a carburetter which allows shutting off the hydrogen supply during an urged idle running, thereby reducing the consumption of hydrogen.

A further object of the invention is to provide a carburetter ensuring a highly accurate dosage of the combustible mixture components.

Still further object of the invention is to provide a carburetter which would be simple in manufacture and reliable in operation.

These and other objects of the present invention are accomplished by that in a method of feeding a carburetter internal combustion engine, wherein a combustible mixture is formed from a petrol-air mixture flow and a hydrogen-air mixture flow and fed to the engine, with the proportions of the components in said combustible mixture being controlled depending on the load on the engine shaft by varying the quantity of the petrol-air mixture and the quantity and composition of the hydrogen-air mixture, according to the invention said control is effected so that the combustible mixture fed to the engine contains (by weight %)
  petrol—from 5.8 to 6.0
  hydrogen—from 0.14 to 0.17
  air—from 93.7 to 94.0
at a load constituting 0.75 (in parts) of the full load the quantities of said components are varied to obtain the following values:
  petrol—from 4.3 to 4.7
  hydrogen—from 0.19 to 0.22
  air—from 95.2 to 95.5;
at a load constituting 0.5 of the full load the quantities of said components are varied to obtain the following values:
  petrol—from 3.0 to 3.2
  hydrogen—from 0.26 to 0.29
  air—from 96.4 to 96.7;
at a load constituting 0.25 of the full load the quantities of said components are varied to obtain the following values:
  petrol—from 1.8 to 2.0
  hydrogen—from 0.37 to 0.40
  air—from 97.6 to 97.8;
at a load constituting 0.1 of the full load the quantities of said components are varied to obtain the following values:
  petrol—from 1.2 to 1.5
  hydrogen—from 0.42 to 0.45
  air—from 98.1 to 98.4;
at loads lying between said load values the quantities of petrol, hydrogen and air in the mixture are varied to obtain proportions lying between said corresponding values.

It has been established by tests that such regulation of the combustible mixture composition during operation of the engine provides for a substantial reduction in the fuel consumption and a higher efficiency of the internal combustion engine in the whole load range thereof without the increase in the toxicity of exhaust gases. At a full load the coefficient $\alpha$ is 1–1.1, at loads from 0.4 to 0.6 of the full load the coefficient $\alpha$ is 1.4–1.6, and for an idle running this coefficient is 2.8–3.2.

The above proportions of petrol, hydrogen and air given for various load conditions are optimum values. Departure from these recommended values at any of said loads results in a substantial worsening of the operating characteristics of the engine.

Thus, if at full load the amount of petrol is increased more than 6% or the amount of air in the mixture is decreased below 93.7% the carbon oxide content in the exhaust gases sharply increases while the engine efficiency decreases as a result of incomplete combustion of fuel. If the quantity of petrol in the combustible mixture is decreased below 5.8% the combustible mixture becomes lean, which leads to the increase of nitrogen oxides in the exhaust gases. On the other hand, the increase in the hydrogen content above 0.17% also leads to an increased discharge of the nitrogen oxides, whereas if the hydrogen content is decreased below 0.14% the engine efficiency decreases. Increasing the air content above 94% leads to the decrease of a maximum permissible load.

At loads constituting from 0.5 to 0.85 of the full load increasing the petrol content or decreasing the air content (with respect to the recommended values) leads to the increase in the nitrogen oxide discharge and a lower efficiency of the engine as a result of the decreased excess-air coefficient. Decreasing the petrol content leads to an increased discharge of non-oxidized hydrocarbon components in the fuel and to a decreased efficiency of the engine. With the decrease of the hydrogen content the quantity of the nitrogen oxides in the exhaust gases increases and so does the consumption of hydrogen, whereas decreasing of the hydrogen content leads to an increased discharge of non-oxidized hydrocarbon components of the fuel and to a sharp decrease of the engine efficiency. A higher air content also results in an increased discharge of said hydrocarbon components, a lower efficiency of the engine, and also to the engine misses.

At loads not exceeding 0.5 of the full load a higher petrol and/or hydrogen content, or a lower air content results in the increase of the nitrogen oxide discharge, and on the other hand in a lower efficiency of the engine as a result of the decrease in the coefficient $\alpha$. At the same time a lower petrol content and a lower hydrogen content or a higher air content affects the ignition of the combustible mixture.

Thus, any departure from the recommended values during the formation of the combustible mixture leads to a sharp increase in the amount of toxic components discharged into the atmosphere and a substantial decrease of the engine efficiency.

These and other objects are also accomplished by that a carburetter comprising a mixing tube connected to the intake manifold of the engine, a first and a second choke tubes communicating with said mixing tube, the first of which choke tubes is provided with a controlled choke valve, a petrol supply unit including a float chamber communicating with the atmosphere, a main dosage system communicating said float chamber with the first choke tube, and a hydrogen supply unit having an injector fitted into the second choke tube, and a hydrogen-feed regulator having a body provided with an inlet pipe and an outlet pipe connected to said injector, and a working member disposed in said body, according to the invention is further provided with a second choke valve located at the outlet of the second choke tube, and an actuating mechanism connected with the choke valves of both the choke tubes and the hydrogen-feed regulator.

The presence of the choke valve in the second choke tube allows the amount of the air passing through the carburetter to be varied in a wide range at all loads on a shaft of the engine. The presence of the actuating mechanism connected to both choke valves and to the hydrogen-feed regulator makes it possible to control the quantity of the petrol (with the aid of the choke valve of the first choke tube), of the hydrogen (with the aid of the choke valve of the second choke tube and said hydrogen-feed regulator), and the air (with the aid of the both choke valves) in accordance with the recommended proportions of the proposed method.

It is expedient that the actuating mechanism in the proposed carburetter be made in the form of a cam connected with the choke valve of the first choke tube, and a pusher interacting with said cam and connected with the choke valve of the second choke tube.

Such construction of the actuating mechanism enables an effective control of the amount and composition of the combustible mixture by selecting a proper configuration of the cam.

It is also expedient that the actuating mechanism in the proposed carburetter be made in the form of a hollow body closed by a spring-loaded diaphragm, communicating with the first choke tube, said diaphragm being movably connected with the choke valve of the second choke tube.

Such construction of the actuating mechanism is a more accurate in regulating the combustible mixture component proportions.

It is also possible that the hydrogen-feed regulator have a centrifugal regulating unit connected to the engine and to the working member of said regulator, said working member being movably connected to said cam.

The presence of the centrifugal regulator which is connected to the engine, provides for controlling the quantity of the hydrogen supplied depending on the rotation speed of the engine shaft, and the movable connection between the working member and the cam allows regulating said hydrogen supply depending on the load on a shaft of the engine.

The hydrogen-feed regulator may be preferably divided by flexible partitions into a hydrogen chamber communicating with the inlet and outlet pipes, an air chamber communicating with the atmosphere, and a vacuum chamber connected with the second choke tube, the working member being disposed in the hydrogen chamber and connected with the partition between the air chamber and the vacuum chamber.

Such construction of the hydrogen-feed regulator provides for controlling the hydrogen supply in the whole load range of the engine by using only one parameter, namely, the quantity of the air passing through the second choke tube, which facilitates to a great extend said control.

It is desirable that the second choke chamber be made in the form of a flat ring provided with a side branch pipe and ajoining at its end faces the first choke tube and the mixing tube, and having an internal annular duct communicating with said branch pipe and with a passage of the flat ring, said hydrognen injector and the choke valve of the second choke tube being disposed in said branch pipe, which permits the size of the proposed carburetter to be substantially reduced.

A good performance can be obtained by using a modification of the proposed carburetter wherein the first choke tube is disposed inside the second one, the choke valve of the second choke tube is disposed between the walls of the both choke tubes, and the hydrogen injector is mounted at the entrance to these choke tubes.

Such construction of the proposed carburetter enables the formation at the choke tubes outlets of a uniform flow of the combustible mixture, which brings about even a higher efficiency of the engine, and especially in multicylinder engines.

In this case the choke valve of the second choke tube may be made in two modifications: in the form of a group of plates each having a shape of an annular sector of a circle, connected to each other for relative displacement about the first choke tube, or in the form of an elestic bushing secured at its edges to the wall of the second choke tube.

The first modification simplifies controlling said choke valve with the aid of the actuating mechanism, whereas the second modification allows the resistance of the second choke tube to a hydrogen-air flow to be decreased.

Very convenient in use is a modification of the proposed carburetter, including an emergency shut-off mechanism for urgent shutting-off of the second choke tube, which mechanism is made in the form of a drive connected with the choke valve of said tube, a shut-off valve mounted on the inlet pipe of the hydrogen-feed regulator, a hydrogen pressure pickup mounted on said inlet pipe before the shut-off valve, and a control unit connected to said drive, said pickup and said shut-off valve.

Such construction allows, in the case of abrupt drop of the hydrogen pressure before the carburetter, caused, for instance, by a damage in the hydrogen supply system, the actuating mechanism to be disconnected from the choke valve of the second choke tube. In this case the second choke tube is shut off with the aid of the emergency shut-off mechanism, in which case the engine will operate on the petrol-air mixture.

There is also possible a modification of the proposed carburetter wherein the inlet pipe of the hydrogen-feed regulator is connected with said hydrogen injector through a by-pass line having a controlled valve, and said carburetter includes a position pick-up of the choke valve of the first choke tube, a speedometer of the engine shaft and a gate mounted on the outlet pipe of said hydrogen-feed regulator.

Such construction let the proposed carburetter be readily adjusted to an idle-running mode.

A modification is also possible wherein the first choke tube is disposed inside the second choke tube, and the choke valves of both the choke tubes are made in the form of a one common valve mounted at the outlet of the mixing tube, and the float chamber and the air chamber of the hydrogen-feed regulator communicate with the atmosphere through controlled throttle valves connected to the actuating mechanism, with the air chamber also communicating with the second choke tube.

Such construction of the proposed carburetter ensures a high operating reliability and a more accurate dosage of the combustible mixture components.

It should be noted that the above-mentioned modifications of the proposed carburetter may be embodied either separately or in combinations which are evident for those skilled in the art.

BRIEF DESCRIPTION OF THE DRAWINGS

A fuller understanding of the nature and objects of the invention will be had from the following detailed description, taken in conjunction with the accompanying drawings in which:

FIG. 1 is a longitudinal section of a carburetter of the invention for feeding carburetter internal combustion engines (in this and other figures the flows of the components of the combustible mixture being formed are shown by arrows and capital letters: A-petrol, B-hydrogen, C-air);

FIG. 2 is a view of the proposed carburetter wherein the actuating mechanism is made in the form of a cam-and-follower assembly, and the hydrogen-feed regulator is provided with a centrifugal regulating unit;

FIGS. 6 and 7 illustrate a modification of the proposed carburetter wherein the body of the hydrogen-feed regulator is divided by flexible partitions into chambers; in FIG. 6 said partitions are made in the form of diaphragms and the actuating mechanism is made in the form of a hollow body closed with a similar spring-loaded diaphragm, and in FIG. 7 said partitions are made in the form of bellows and the actuating mechanism is a cam-and-follower assembly;

FIG. 8 shows in an enlarged scale the second choke tube for the case when the annular duct communicates with a passage opening of the flat ring through a groove along the whole circumference of the ring;

FIG. 9 shows the same as in FIG. 8, for the case when said duct communicates with the passage hole of the flat ring through radially disposed openings;

FIG. 10 shows the second choke tube in combination with the other elements of the proposed carburetter;

FIG. 11 shows the choke valve of the second choke tube, made in the form of a group of plates in the form of annular sectors;

FIG. 12 is a section along line XII—XII in FIG. 11;

FIG. 13 shows the choke valve of the second choke tube, made in the form of an elastic bushing connected with the actuating mechanism through an additional pressure source;

FIG. 14 is a section along line XIV—XIV in FIG. 13 for a case when the elastic bushing is connected with the actuating mechanism through a flexible member;

FIG. 17 shows the acuating mechanism incorporating a cam movably connected to said throttles;

FIG. 18 shows the actuating mechanism made in the form of a hollow body with a diaphragm movably connected to said throttle valves;

DETAILED DESCRIPTION OF PREFERRED EMBODIMENTS

Figure 3:
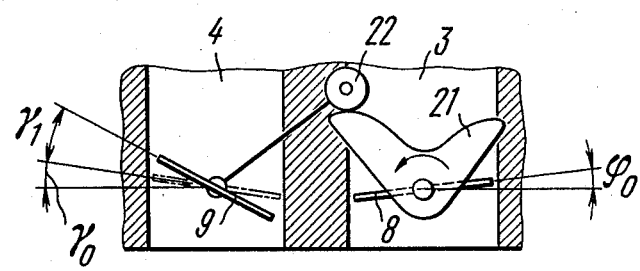
FIGS. 3–5 show in detail the operation of the cam-and-follower assembly FIG. 2 (shown by the arrow is direction of rotation of the cam when the load increases.

The proposed method of feeding a carburetter internal combustion engine is carried out with the aid of a carburetter which comprises a mixing tube 1 (FIG. 1)

connected to the inlet manifold of an engine 2, a first and a second choke tubes 3 and 4 respectively, a petrol supply unit 5, a hydrogen supply unit 6, and an actuating mechanism 7. Both choke tubes 3 and 4 are provided with choke valves 8 and 9 respectively, and in particular with choke valves of a butterfly type. The choke valve 8 of the first choke tube 3 has a drive which is in this particular case an accelerator pedal 10.

The petrol supply unit 5 includes a float chamber 11 filled with petrol 12, and a main dosage system 13 having a petrol nozzle 14, which main dosage system 13 communicates the float chamber 11 with the mixing tube 3. The float chamber 11 communicates with the atmosphere through a duct 11a and has a branch pipe 11b for petrol, as well as a float mounted in said float chamber and provided with a float needle valve 16 introduced into the branch pipe 11b.

Each choke tube communicates at one side with the atmosphere, and at the other side with the mixing tube 1, the choke valves 8 and 9 being mounted at the outlets of the choke tubes 3 and 4 respectively, that is at the entrance to the mixing tube 1. It is clear that the choke tubes 3 and 4 may communicate wih the atmosphere either directly or through an air cleaner, blower or any other conventional elements (not shown in the drawings). The first choke chamber is provided with a throat 17, and the nozzle 14 is fitted into the first choke tube through a hole provided in the throat 17.

The hydrogen supply unit 6 includes an injector 18 fitted into the second choke tube 4, and a hydrogen-feed regulator 19 connecting the injector 18 with a hydrogen supply source (not shown in the drawings). This regulator 19 has a body 20 provided with an inlet pipe 20a for feeding hydrogen and an outlet pipe for intruducing said hydrogen to the injector 18, as well as a working member (not shown in FIG. 1) disposed in the body 20.

The hydrogen-feed regulator 19 and the choke valve 8 and 9 are connected with the actuating mechanism 7, as shown by a dotted line in FIG. 1.

Both the hydrogen-feed regulator 19 and the actuating mechanism 7 may be variously embodied. Shown in FIG. 2 is one modification of the proposed carburetter, wherein the actuating mechanism is made in the form of a cam-and-follower assembly, including a cam 21 secured on the axle of the choke valve 8, and a pusher 22 secured on the axle of the choke valve 9 and brought in contact with said cam 21.

The hydrogen-feed regulator apart from the body 20 further includes a centrifugal regulating unit 23 comprising a fork 24 connected with the output shaft of the engine 2 (shown in dotted line), bell-cranks 25 pivoted on said fork 24, a rod 26 which is a working member of said regulator, and a jet 27. The bell-cranks 25 carry inertia weights 28. The rod 26 has at its one end a hinge pivot on which are carried bell-cranks 25, whereas its other end is pointed and introduced into the jet 27, as shown in FIG. 2. The regulator 19 also has a spring 29 urging the rod 26 to the jet 27 and the bell-cranks 25.

The air jet 27 is mounted in the body 20 for displacement along the axis of the rod 26 (in the direction shown by the arrows) and is movably connected with the choke valve 8 of the first choke tube 3 and with the cam 21, as shown in dotted line in FIG. 2. The jet 27 is flexibly connected with the outlet pipe 20b through a bellows 30. It is quite evident that instead of the bellows 30 use may be made of any other suitable means which could ensure a flexible connection of the jet 27 with the outlet pipe 20b, for instance, with the aid of a rubber pipe. It is also clear that instead of the rod 26 use may be made of any other conventional element suitable for this purpose, that is as a working member of the regulator 19, which working member may be, for instance, a slide valve.

The profile of the cam 21 and the configuration of the pusher 22 determine a relative position of the choke valves 8 and 9, and thus determine, according to the proposed method, a control mode of regulating the composition of the combustible mixture during the operation. In particular, if the choke tubes 3 and 4 have a cylindrical shape and are equal in diameter, the cam-and-follower assembly is designed so as to satisfy the following condition $$\gamma = K_1\phi^3 + K_2\phi^2 + K_3\phi + 5,$$

where $\phi$ and $\gamma$ are angles of turning of the choke valves 8 and 9 in the first 3 and the second 4 choke tubes (in degrees);

$K_1 \ldots K_3$ are proportionality factors, which are: $K_1$ from $-0.125$ to $-0.130$, $K_2$ from $-0.03$ to $-0.04$, $K_3$ from 1.95 to 2.15.

Figure 4:
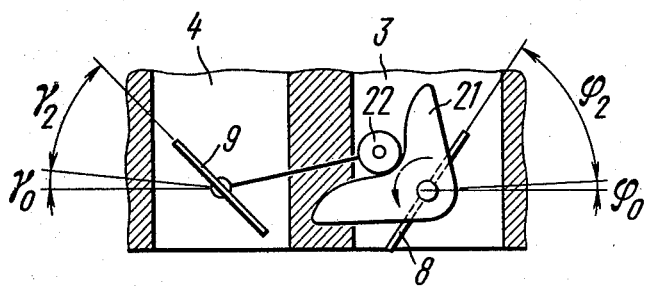
Figure 5:
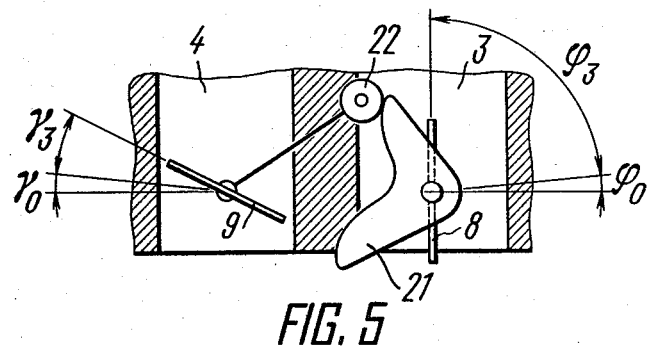

The configuration of the elements of the cam mechanism and their interaction for this particular case are shown in FIGS. 3-5. Shown in FIG. 3 are relative positions of the cam 21 and the pusher 22, and connected thereto the choke valves 8 and 9 for the idle-running mode. In this case the angles $\phi_0$ and $\gamma_0$ are angles of the choke valves 8 and 9 at which the choke tubes 3 and 4 are fully closed. In this particular case these angles are equal and constitute from 7° to 10°. Angle $\gamma_1$ is the angle of rotation of the choke valve 9 sufficient to provide such an opening of the choke tube 4 which provides a minimum idle-running speed, in which case $\alpha = 2.8$–3.2. The angle $\gamma_1$ is from 4° to 6°.

The relative positions of the cam 21 and the pusher 22 in the case of maximum opening of the choke valve 9 are shown in FIG. 4. The angle of maximum opening of said valve is denoted by $\gamma_2$ and constitutes from 35° to 45°, in which case the cam 21 and the choke valve are turned from their initial position through an angle of $\alpha_2$ constituting from 55° to 65°. Said relative positions of the choke valves 8 and 9 correspond to a load on a shaft of the engine between 0.5 to 0.7 of the full load. The conducted tests have shown that at this load the consumption of hydrogen is maximum.

FIG. 5 shows relative positions of the choke valves 8 and 9 at a full load on a shaft of the engine. In this case the cam 21 and the choke valve 8 are turned from their initial position through an angle $\alpha_3$ (which corresponds to that the choke tube 3 is fully opened) constituting from 80° to 83°, in which case the choke valve 9 and the pusher 22 are turned through an angle $\gamma_3$ which is from 20° to 25°.

It is clear that the cam 21 and the pusher 22 may be variously designed to suit specified conditions, which can be readily understood without detailed explanation.

The proposed method of feeding a carburetter internal combustion engine is practised with the aid of the above carburetter in the following manner.

The petrol-air mixture flow is formed in the first choke tube 3 (FIG. 1) from the air taken from the atmosphere and the petrol supplied from the float chamber 11 through the nozzle 14. The composition of the petrol-air mixture remains in general constant $(0.95 < \alpha < 1.05)$ at all operating conditions of the engine due to the proportional change of the quantity of the drawn-in petrol with respect to the quantity of the air flowing through the choke tube 3. The quantity of the petrol-air mixture is controlled by the choke valve 8 operated by the accelerator pedal 10.

Simultaneously, in the choke tube 4 there is formed a hydrogen-air mixture from the air taken from the ambient atmosphere and the hydrogen injected through the injector 18. The composition of this flow is determined by the variation of the quantity of the hydrogen which quantity is controlled by the regulator 6 operated by the actuating mechanism 7, which actuating mechanism 7 also operates the choke valve 9 to control the quantity of the hydrogen-air mixture flowing through the choke tube 4.

The petrol-air mixture from the first choke tube 3 and the hydrogen-air mixture from the second choke tube 4 flow into the mixing tube 1 wherein they are mixed to form a combustible gaseous mixture which is fed to the engine 2.

When operating at a full load the choke valve 8 of the first choke tube 3 is fully opened, in which case the actuating mechanism 7 connected thereto rotates the choke valve 9 of the second choke tube 4 and simultaneously operates the hydrogen-feed regulator so that the proportions of petrol, hydrogen and air in the combustible mixture being formed is maintained in accordance with the above recommended proportions.

When the load on a shaft is decreased the valve 8 of the choke tube 3 is partially closed by means of the accelerator pedal 10, thereby decreasing the amount of the petrol-air mixture (and hence the quantity of the petrol) fed to the mixing tube 1. Simultaneously, the actuating mechanism 7 operates the hydrogen-feed regulator 19 and the choke valve 9 of the choke tube 4 to change the quantity and composition of the hydrogen-air mixture and to thereby produce a required composition of the combustible mixture depending on the actual load on a shaft of the engine.

In is to be noted that the petrol supply unit 5 and the hydrogen supply unit 6 are so constructed that the variation of the engine rotation speed causes proportional changes in the quantities of the air, petrol and hydrogen without changing their proportions.

At a minimum idle-running speed the choke valve 8 of the first choke tube 3 is closed, in which case the actuating mechanism 7 operates the choke valve 9 to slightly open it and to thereby let the air be fed to the engine only through the second choke tube 4, which air is mixed therein with hydrogen supplied by the injector 18. In this case the combustible mixture is composed only from two components (the petrol is not fed), thereby reducing the fuel consumption.

If the actuating mechanism is made in the form of a cam-and-follower assembly (FIG. 2) and there is provided a centrifugal regulator unit 23 in the hydrogen-feed regulator 19 the proportions of the petrol, hydrogen and air are controlled in the following manner.

When the choke valve 8 is rotated the cam 21 also rotates in synchronization therewith, thereby causing, through the pusher 22, the choke valve 9 to rotate, as a result of which the flow sections of the choke tubes 8 and 9 change. This, in turn, leads to the change and redistribution in the quantity of the air passing through the choke tubes 8 and 9, thereby changing the composition (that is proportions of the components) of the combustible mixture as a whole.

Regulating the quantity of the hydrogen being fed with the aid of the regulator 19 shown in FIG. 2 is effected in the following manner. As the rotation speed of the engine output shaft increases the quantity of the air fed to the carburetter increases and in order to maintain the proportions of the components constant it is necessary to increase the quantity of the hydrogen (in this case the quantity of the petrol will increase proportionally) fed to the choke tube 4 through the hydrogen injector 18. This is attained by that with the increase of the rotation speed of said engine shaft the fork 24 of the centrifugal regulator unit 23 starts rapidly rotating, as a result of which the inertia weights are forced to part from each other and to thereby urge the rod 26 from the jet 27. The flow section of this jet 27 increases, thus increasing the quantity of the hydrogen fed to the outlet pipe 20b and the hydrogen injector 18.

When the rotation speed of the engine output shaft decreases the inertia weights 28 are forced to each other, in response to which the rod 26 partially closes, that is decreases, the flow section of the jet 27, thereby decreasing the quantity of the hydrogen fed to the hydrogen injector 18.

The spring 29, inertia weights 28 and ratio of the arm of each lever 26 are selected so as to ensure regulating the hydrogen feeding at all rotation speeds of the engine.

If the load on a shaft of the engine is increased from a minimum (idle running) to a value constituting 0.5–0.7 of the full load with the rotation speed maintained unchanged, the choke valve in the choke tube 3 is opened further so that the proportion of the petrol in the combustible mixture increases, thus necessitating the increase in the quantity of the hydrogen being fed. Increasing the quantity of the hydrogen in this case is effected by that the cam 21 while rotating together with the choke valve 8 operates through the movable connection the jet 27 urging the latter from the rod 26, thereby increasing the flow section of the jet 27.

As the load on a shaft is further increased to the full load the opening of the choke valve 8 continues to be increased, in which case, however, the cam 21 now operates the jet 27 so as to decrease the quantity of the hydrogen being fed.

Shown in FIG. 6 is another modification of the proposed carburetter, wherein the body 20 of the hydrogen-feed regulator 19 is divided by flexible partitions, in this particular case by diaphragms 31 and 32, into an air chamber 33, hydrogen chamber 34 and vacuum chamber 35. The hydrogen chamber 33 communicates with the inlet pipe 20a and the outlet pipe 20b of the hydrogen-feed regulator 19. The air chamber 34 communicates with the atmosphere through the duct 34a. The vacuum chamber is connected through a communicating duct 36 with the choke tube 4. The hydrogen-feed regulator 19 also includes a needle valve 37 as a working member, secured on and running through the diaphragm 31, as well as a spring 38 to urge the needle 36 against the inlet pipe 20a.

According to this modification the actuating mechanism 7 is made as a hollow body 39 closed with a diaphragm 40, and a spring 41 mounted in said body and maintained in contact with said diaphragm. The body 39 communicates through a connecting duct 42 with the first choke tube 3. In this case the duct 42 pneumatically connects the actuating mechanism 7 with the choke valve 8 (that is through an air flow passing through the choke tube 3).

The diaphragm 40 is movably connected with the choke valve 9 of the second choke tube 4, as shown in the drawings. Said movable connection is effected so that when the diaphragm moves in one direction the choke valve 9 may rotate in different directions depending on the load on a shaft of the engine (on the position angle of the choke valve 8) according to that law of rotation of the choke valves 8 and 9, which was mentioned above with respect to the actuating mechanism 7 made in the form of a cam-and-follower assembly.

The above modification of the proposed carburetter operates in the following manner. The combustible mixture is formed in a similar manner as described above. At a full load the choke valve 8 is fully opened. The vacuum produced in the first choke tube 3 is transmitted through the channel 42 to the cavity of the body 39 of the actuating mechanism 7, thereby causing the diaphragm 40 to deflect inwards the cavity of the body 39, in response to which the choke valve 9 turns to provide sufficient opening, i.e. flow section of the second choke tube 4. In this case a vacuum is produced in the choke tube 4, which vacuum spreads through the channel 36 to the vacuum chamber 35 of the hydrogen-feed regulator 19. As a result, the diaphragm 32 is caused to deflect inwardly of the chamber 35, thereby contracting the spring 38 and forcing the needle valve 37 from the inlet pipe 20a. In this way there takes place a controlled (i.e. desired) consumption of the hydrogen at a given load.

When the load on a shaft is decreased to a value constituting from 0.5 to 0.7 of the full load, the choke valve 8 is partially closed. The pressure in the first choke tube 3 and the cavity of the body 39 increases and the spring 41 urges the diaphragm 40 back, thereby to turn the choke valve 9 and thus to increase the flow section of the choke tube 4. This results in that the quantity of the air passing through the choke tube 4 increases and the pressure in said choke tube and in the chamber 35 of the regulator 19 decreases. As a result, the quantity of the hydrogen fed to the hydrogen chamber 33 and (through the outlet pipe 20b and the injector 18) to the choke tube 4 increases.

As the load decreases to a minimum the choke valve is further closed, in response to which the pressure in the choke tube 3 and the cavity of the body 39 increases to cause the diaphragm to deflect further in the same direction.

In this case the movable connection of the diaphragm 40 with the choke valve 9 provides closure of the latter, to thereby decrease the air flow through the choke tube 4 and increase the pressure therein. The pressure in the vacuum chamber also increases and the spring 38 urges the needle 37 through the diaphragm 32 against the inlet pipe 20a, thereby decreasing the quantity of the hydrogen fed to the choke tube 4.

It should be noted that the above modification due to the presence of the air compartment in the hydrogen regulator 19 makes the proposed carburetter suitable for use under conditions wherein there takes place a strong variation of the atmospheric pressure, for instance in mountains. Thus, with the increase of the atmospheric pressure the pressure in the air chamber 34 also increases thereby causing the diaphragm 32 to deflect inwardly of the vacuum chamber 35 in response to which the needle valve 37 let more hydrogen be fed into the choke tube 4. The thus increased quantity of hydrogen fed to the choke tube 4 is required to compensate the increased quantity of the air flowing into the carburetter as a result of the increase of the atmospheric pressure. If the atmospheric pressure decreases the regulation is conducted in a reverse order.

It is to be noted that as flexible partitions in the regulator 19 use may be made not only of the diaphragms 31 and 32 but also of bellows 43 and 44 (FIG. 7).

In this case the actuating mechanism may have any construction, and in particular such that have been described above and shown in FIG. 2. The regulator 19 made as shown in FIG. 7 has a smaller size and is more reliable in operation as compared to that shown in FIG. 6. The carburetter of this modification may be advantageously used under higher mechanical loads, for instance, in cross-country vehicles.

Figure 8:
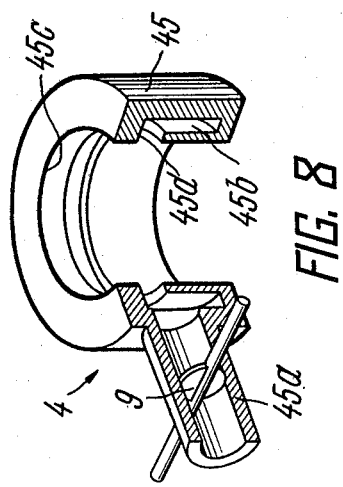

Shown in FIGS. from 8 to 10 is a modification of the proposed carburetter, wherein the choke tube 4 is made in the form of a flat ring 45 (FIG. 8) having a side branch pipe 45a and an internal annular duct 45b communicating with said branch pipe 45a and a passage of the ring 45 through a groove 45d made along the whole circumference of said passage. The choke valve 9 of the choke tube 4 is mounted in the side branch pipe 45a, as shown in the drawings.

Figure 9:
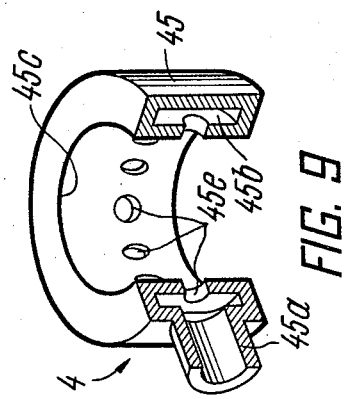

The flat ring 45 may be made so that its annular channel 45b communicates with its passage through radially disposed openings 45e (FIG. 9).

Figure 10:
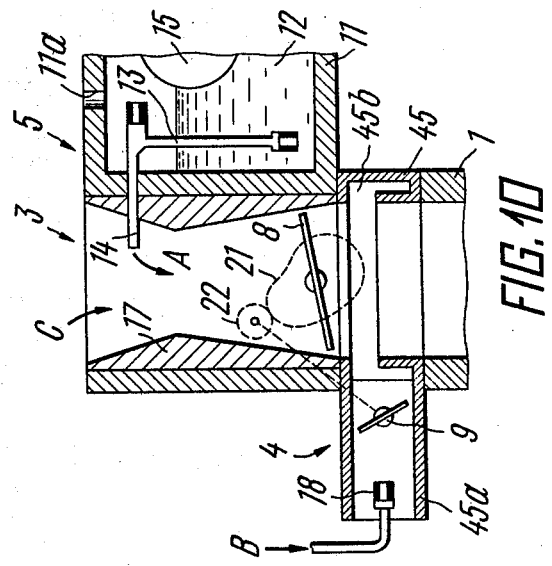
FIGS. 8–10 illustrate a modification of the proposed carburetter, wherein the second choke tube is made in the form of a flat ring having a side branch pipe and an internal annular duct, and in which figures.

The said ring is mounted in the proposed carburetter as shown in FIG. 10: its upper end face adjoins the first choke tube 3, while its lower end face adjoins the mixing tube 1, in which case the hydrogen injector is fitted into the side branch pipe 45a of the ring 45. Such construction, apart from being smaller in size, makes it possible to readily re-equip a motor car having a conventional petrol-air carburetter for operation on a petrol-hydrogen-air mixture, since said conventional petrol-air carburetter may be used as a first choke tube 3 and a petrol supply unit 5 practically without constructional changes.

Figure 11:
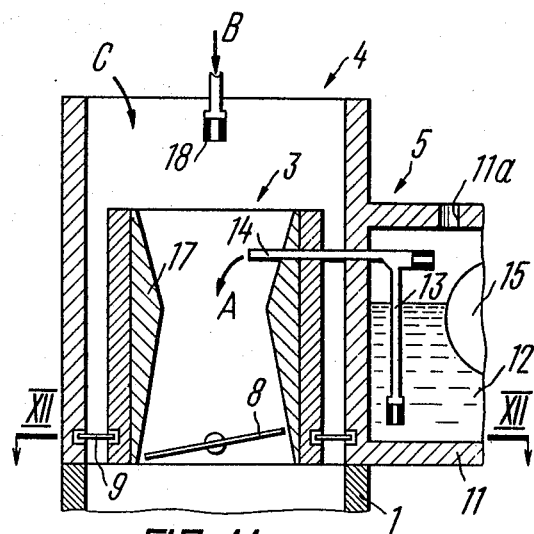
FIGS. 11–14 illustrate a modification of the proposed carburetter, wherein the first choke tube is disposed inside the second one, the choke valve of the second choke tube is disposed between the walls of the both choke tubes, and the hydrogen injector is mounted at the entrance to said choke tubes, and in which figures.
Figure 12:
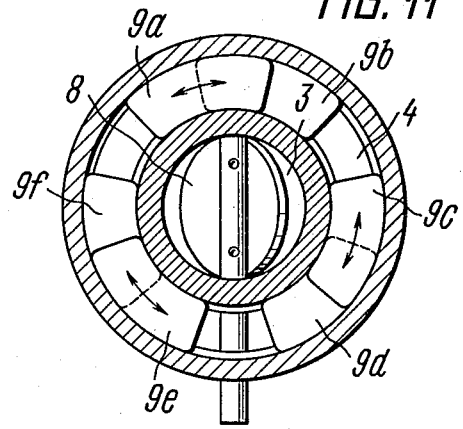

A modification of the proposed carburetter is possible, wherein the first choke tube 3 is disposed within the second choke tube, such as shown, for instance, in FIG. 11. In this modification the hydrogen injector 18 is mounted at the entrance to the both choke tubes 3 and 4, and the choke valve of the second choke tube 4 is located between the walls of said choke tubes. This choke valve 9 is made in the form of a group of plates 9a-9f (FIG. 12) having a shape of annular sectors and positioned in pairs, as shown in FIG. 12. In each pair the plates are connected to each other for relative displacement about the first choke tube 3 in the directions shown by the arrows.

The connection of thus modified choke valve 9 with the actuating mechanism (not shown) and the choke valve 8, and the operation of the choke valve 9 are expected to be readily understood from the description of the aforesaid modifications and therefore is not given herein in greater detail. Such construction of the proposed carburetter ensures a uniformity of the combustible mixture obtained, thereby providing for better conditions of its combustion.

The choke valve in the second choke tube 4 may also be made in the form of an elastic bushing 46 (FIG. 13) secured at its edges to the wall of the choke tube 4 and being capable of deforming to take a shape shown in dotted line.

Figure 13:
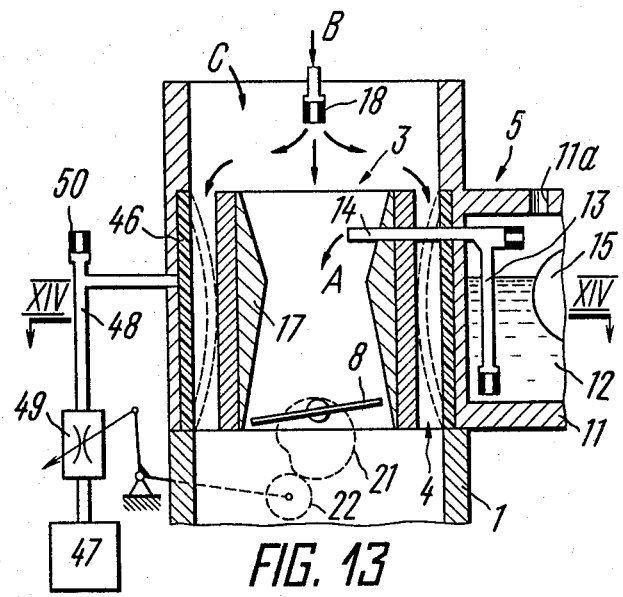

Deforming the bushing 46 for changing its shape, as shown in FIG. 13, in order to vary the flow section of the choke tube 4 may be done in different ways.

It is possible, for example, as shown in FIG. 13, to fill under the lateral surface of this bushing a gas, for instance air supplied from a source 47 though a connection duct 48 controlled by a throttle 49 and an air jet 50. In this particular case the actuating mechanism is made in the form of a cam 21 and a pusher 22 movably connected with the throttle 49. The air jet 50 is adapted to release a part of the air into the atmosphere and to thereby maintain together with the throttle valve 49 a required pressure between the wall of the choke tube 4 and the bushing 46, the pressure change is determined by the profile of the cam 21 in accordance with the proposed method of feeding an engine.

The bushing 46 may also be operated with the help of a flexible means, for instance, a cable 51 (FIG. 14) encompassing the bushing 46 in the middle portion thereof. One end of this cable 51 is secured on the wall of the choke tube 4 and the other end thereof is passed through an opening provided in said wall and connected to the pusher of the actuating mechanism (not shown).

Figure 14:
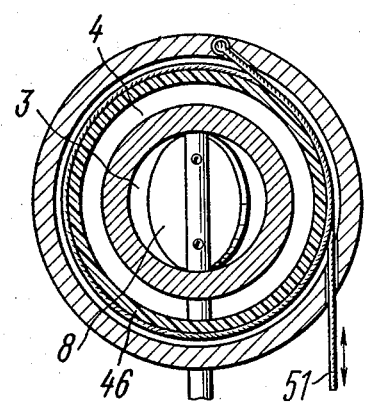

The carburetter having a choke valve made as shown in FIGS. 13 and 14 provides for a low aerodynamic resistance of the second choke tube 4 to the flow of the hydrogen-air mixture, thereby improving the efficiency of the engine.

Figure 15:
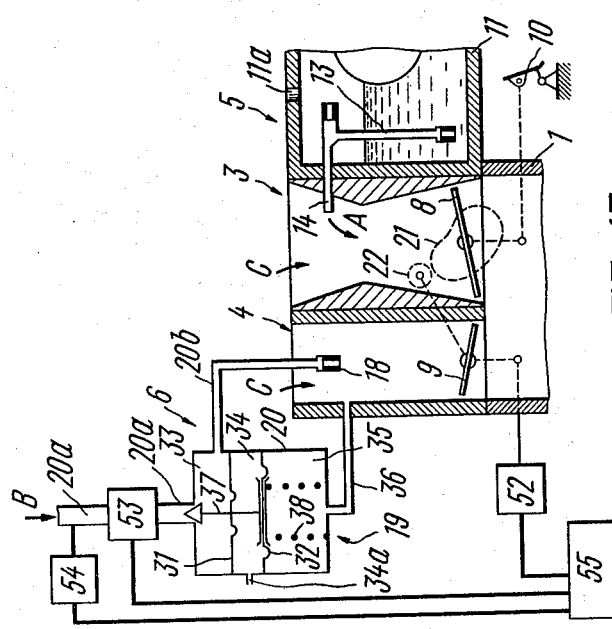
FIG. 15 shows a modification of the proposed carburetter, wherein said carburetter is provided with an emergency shut-off mechanism.

In a modification shown in FIG. 15 the proposed carburetter is provided with an emergency shut-off mechanism adapted to shut off the second choke tube, which emergency shut-off mechanism is made in the form of a drive 52 connected with the choke valve 9 of said choke tube 4, and a shut-off valve 53 mounted on the inlet pipe 20a of the hydrogen-feed regulator 19, a hydrogen pressure pick-up 54 and a control unit 55. The pick-up 54 is connected with the inlet pipe 20a. The drive 52 may be variously constructed, for instance, in the form of a solenoid with a core. The pick-up 54, drive 52 and the shut-off valve 53 are electrically connected with the control unit 55.

The emergency shut-off mechanism of the second choke tube operates as follows. When the pressure in the hydrogen supply pipeline (not shown) drops, which may occur for different reasons, for instance, in the case of damage or short of the hydrogen, the pick-up 54 produces a signal which is applied to the control unit 55 which, in response to this signal, operates the shut-off valve 53 to close the inlet pipe 20a, and the drive 52 to close the choke valve 9 and urge the pusher 22 from the cam 21 (in FIG. 15 the pusher 22 is shown in its disengaged position).

This modification of the proposed carburetter is of particular advantage in the case of motor cars, as in the case of a sharp drop of hydrogen pressure the above emergency shut-off mechanism makes it possible to continue driving, with the engine operating only on petrol.

Figure 16:
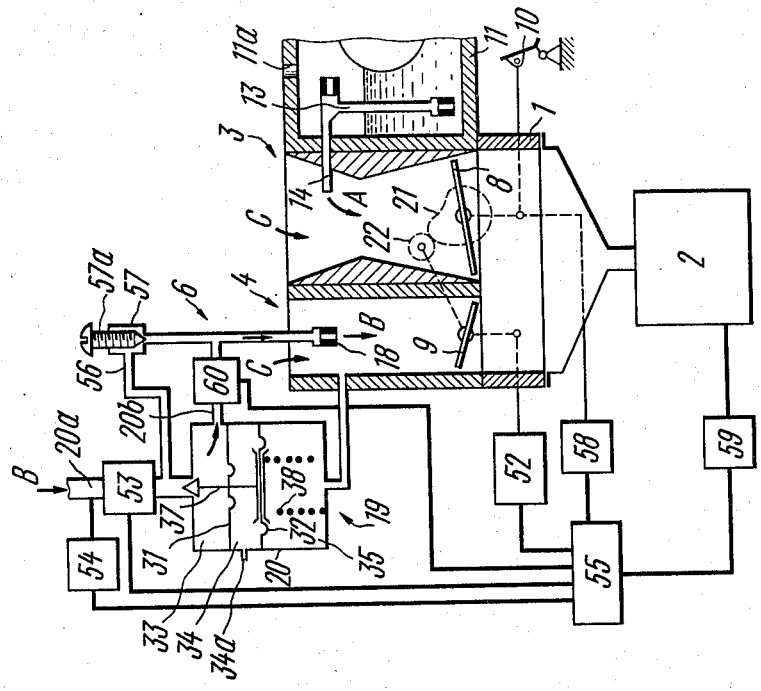
FIG. 16 shows a modification of the proposed carburetter, wherein the inlet pipe of the hydrogen-feed regulator is connected with the hydrogen injector through a by-pass line with a controlled valve, and wherein there are provided a position pick-up of the choke valve of the first choke tube, the speedometer of the engine shaft and a gate on the outlet pipe of the hydrogen-feed regulator.

From the viewpoint of adjusting the proposed carburetter to a slow idle-running speed the most preferable is a modification of said carburetter shown in FIG. 16, wherein the inlet pipe 20a of the regulator 19 is connected with the injector 18 through a by-pass line 56 having a valve 57 mounted thereon and provided with an adjusting screw 57a. The carburetter also includes a position pick-up 58 of the choke valve 8 of the first choke tube 3, a speedometer 59 of the motor shaft, and a gate 60 disposed on the outlet pipe 20b of the hydrogen-feed regulator 19, all said elements being connected to the control unit 55.

The above modification of the proposed carburetter operates as follows. When the choke valve 8 of the first choke tube 3 is fully closed the pick-up 58 produces and transmits a signal to the control unit 55 in response to which signal said control unit operates the gate 60 to close the outlet pipe 20b, in which case the hydrogen is passed through the by-pass line 56 and the valve 57 to the injector 18, with quantity of the hydrogen being fed being regulated by the adjusting screw 57a.

If at this moment the rotation speed of the engine shaft is higher than for a slow idle-running mode, the pick-up 59 transmits a signal to the control unit 55 which in response to said signal produces a command signal causing the shut-off valve 53 to close, in which case the hydrogen supply to the engine is ceased, thus decreasing the consumption of hydrogen.

In this case due to the presence of the adjusting screw 57a in the valve 57 there is no need to readjust the hydrogen-feed regulator 19 in accordance with the temperature of the ambient atmosphere and other influencing factors.

Figure 17:
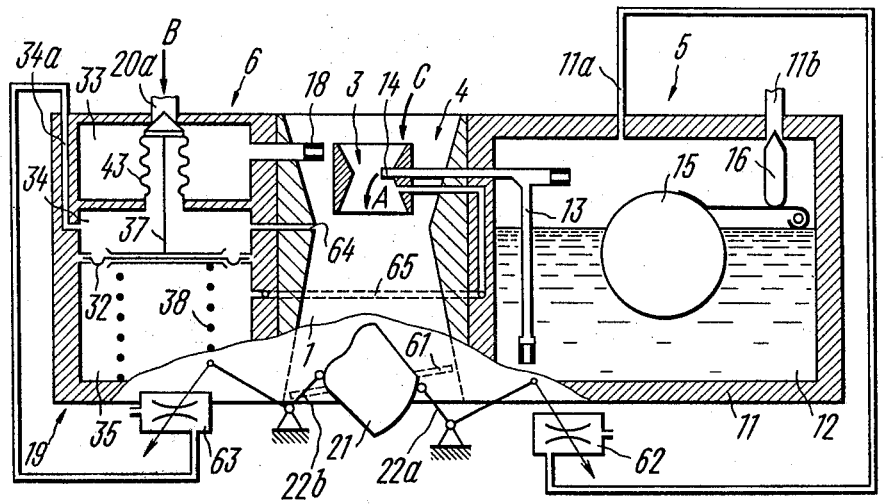
FIGS. 17 and 18 illustrate a modification of the proposed carburetter, wherein the choke valves of the both choke tubes are made in the form of a one choke valve disposed at the outlet of the mixing tube, and the float chamber and the air chamber of the hydrogen-feed regulator communicate with the atmosphere through controlled throttle valves, in which figures.

FIG. 17 shows another modification of the proposed carburetter, wherein the first choke tube 3 is disposed inside the second choke tube 4, with the mixing tube 1 being an extention of said choke tube 4. This carburetter has a common choke valve 61 for the both choke tubes 3 and 4, which valve 61 is located at the outlet of the mixing tube and performs the functions of both the choke valve 8 and the choke valve 9 used in the aforesaid modifications of the proposed carburetter. The carburetter also includes controlled throttle valves 62 and 63.

The throttle valve 62 is mounted at the outlet of the duct 11a through which the float chamber 11 communicates with the atmosphere, and the throttle valve 63 is mounted at the outlet of the duct 34a, which communicates the air chamber 34 of the hydrogen feed regulator with the atmosphere. The actuating mechanism is made in this case in the form of a cam 21 secured on the axle of the valve 61, and two pushers 22a and 22b each being movably connected with the throttle valves 62 and 63 respectively. Furthermore, the air chamber 34 of the regulator 19 communicates through a duct 64 with the second choke tube 4. To make the hydrogen-feed regulator 19 more sensitive to the changes in operating conditions of the engine, the vacuum chamber 35 communicates through the duct 65 with the first choke tube 3.

The proposed carburetter of the above modification operates as follows. If the engine operates at full load the valve 61 is fully opened and the flow section of the mixing tube 1 is maximum. The cam 21 through the pushers 22a and 22b sets such flow sections of the throttle valves 62 and 63 at which the combustible mixture has a composition which is required to a given operating condition, as has been explained above.

When the load is decreased to a value constituting from 0.5 to 0.7 of the full load, the flow section of the mixing tube 1 is decreased through the valve 61, in response to which the quantity of the air flowing through the choke valves 3 and 4 decreases. The cam 21 operates the pusher 22a to reduce the flow section of the throttle valve 62 and to thereby cause the pressure in the float chamber 11 to decrease. Thus disturbs a steady-state ratio between the quantities of air and petrol in the combustible mixture so that proportion of the petrol therein decreases. Simultaneously, the cam 21 operates through the pusher 22a the throttle valve 63 to thereby increase the flow section thereof, thus causing the increase in pressure in the air chamber of the hydrogen-feed regulator 19. As a result the diaphragm 32 deflects and draws out thereby the needle valve from the inlet pipe 20a, thus increasing the quantity of hydrogen being incorporated in the combustible mixture. In this way at a given load the combustible mixture components are mixed in correct proportions in accordance with the proposed method.

As the load on a shaft decreases further the passage of the mixing tube 1 is further decreased by the valve 61, in response to which the quantity of the air further decreases. The cam 21 by operating the throttle valve 62 further decreases the flow section thereof, thereby bringing down the quantity of petrol in the combustible mixture.

At the same time the cam 21 through the pusher 22b starts to decrease the flow section of the throttle valve 63, thereby causing lowering of pressure in the air chamber 34 of the regulator 19, and hence decreasing the quantity of hydrogen being fed. In this case, however, the proportion of the hydrogen in the combustible mixture continues to increase because of a more rapid decreasing of the proportions of the air and petrol.

The operation of the carburetter of the above modification in the case of slow idle running substantially is similar to those described in connection with the aforementioned modifications.

It should be noted that the modification of the proposed carburetter shown in FIG. 17 provides for a more accurate proportioning of the combustible mixture components, which is attained by that the pressure in the float chamber 11 and the air chamber 34 of the regulator 19 can be smoothly varied with aid of the throttle valves 62 and 63.

Figure 18:
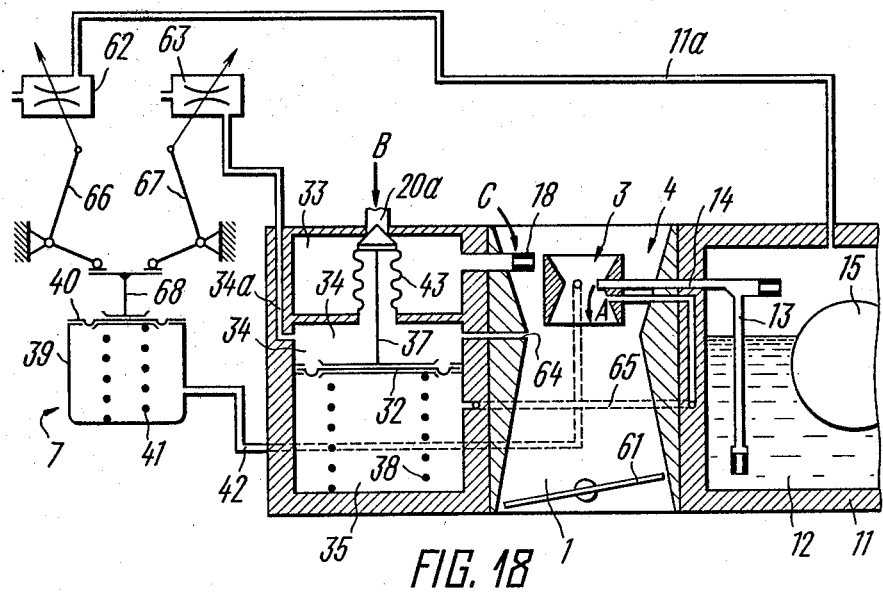

Under conditions when the speed of a transport vehicle has to be frequently changed the efficiency of the proposed carburetter may be improved by employing a modification shown in FIG. 18, wherein the actuating mechanism 7 is made in the form shown in FIG. 6, i.e. a hollow body 39 closed with a diaphragm 40, and a spring 41 mounted within said hollow body. Like in the modification shown in FIG. 17, the carburetter of this modification has controlled throttle valves 62 and 63 through which the float chamber 11 and an air chamber 34 of the regulator 19 communicate with the atmosphere. Said valves 62 and 63 are connected through the levers 66 and 67 and the rod 68 with the diaphragm 40 of the actuating mechanism 7.

Practising the proposed method with the use of this modification of the proposed carburetter is done similar to that described above. Due to the movable connection between the diaphragm 40 of the actuating mechanism 7 and the throttle valves 62 and 63 the engine speed is maintained constant even when the load on a shaft of the engine varies because, for instance, of the changes in a lay of the road.

Thus, with the increase of rotation speed of the engine shaft the speed of an air flow passing into the carburetter increases, with the valve 61 remaining in the same position, which results in that the vacuum in the cavity of the body of the actuating mechanism increases, thereby causing the diaphragm 40 to deflect inwardly of the body 39. The diaphragm 40 acting through the rod 68 and levers 66 and 67 alters the flow sections of the throttle valves 62 and 63 to such extent that the total quantity of the petrol and hydrogen in the combustible mixture decreases. When the speed of rotation of the engine shaft decreases the carburetter operates in a reverse order.

Thus the above modification of the proposed carburetter raises even more the reliability of the engine and the transport vehicle as a whole.

Given below are data proving a high efficiency of the proposed method of feeding a carburetter internal combustion engine, carried out with the use of the above-described modifications of the proposed carburetter.

Figure 19:
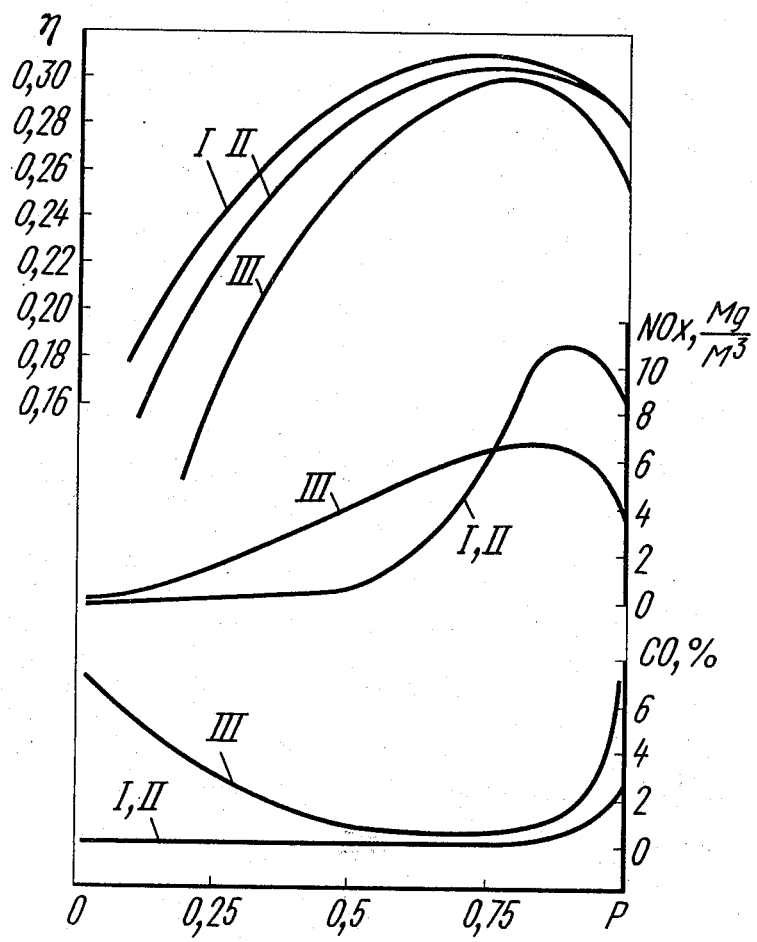
FIG. 19 is a graph showing the engine efficiency variation and how the quantity of the toxic component in the exhaust gases varies with load with the use of the proposed method in comparison with the prior art methods of feeding a carburetter internal combustion engine.

Shown in FIG. 19 is a graph showing variation in the efficiency ($\eta$) of the engine and the quantity of the toxic components (nitrogen oxides $NO_x$ and carbon oxide CO) in the exhaust gases depending on the load (P) on a shaft of the engine while practising the proposed method (line I) and the prior art methods (lines II, III). In this case line II designates data relating to the method disclosed in USSR Author's Certificate No. 670,739, and referred to above, and line III designates data relating to the conventional method of feeding an engine with a combustible mixture composed of petrol and air.

As can be seen from this graph the efficiency of the engine using the method of the invention is substantially higher, while the content of the nitrogen oxides and carbon oxide in the exhaust gases is not higher than those in the motors utilizing the prior art carburetters.

Below in a tabulated form are given toxicity values obtained during the test driving of an automobile having a weight of 1.5 tons and a displacement volume of 2500 $cm^3$ in accordance with the European driving test cycle and in an idle-running mode, employing the method and the carburetter of the invention in comparison with the prior art. The test was conducted without the use of any additional means to neutralize the exhaust gases. Results relating to the proposed method we obtained for mean values of content ranges relating to the quantities of the petrol, hydrogen and air, recommended by us for each particular load condition, although they are valid (with slight deviations) for all values within corresponding ranges.

The tests conducted in accordance with the European driving test cycle have shown that the fuel consumption for 100 km with the engine being started in a warmed-up state, was for the proposed method 6.8 l of petrol and 1.56 kg of hydrogen, whereas for the conventional method the fuel (combustible mixture composed of petrol and air) consumption was 15.9 l of petrol, from which it is clear that the proposed method permits the fuel consumption to be substantially reduced and the toxicity of the exhaust gases to be decreased.

While particular embodiments have been shown and described various modifications thereof will be apparent to those skilled in the art and therefore it is not intended that the invention be limited to the disclosed embodiments and the invention may be variously otherwise embodied within the scope of the appended claims.

|  |  |  | Toxic Components Content | | Prior art method and carburetor (combustible mixture of petrol and air) | USSR State Standards for 1982 (GOST 17.2.2.03-77 and GOST 37.001.018-78) |
|  |  |  | With the proposed method and carburetor | | | |
| Test technique | Toxic substance | Unit of measurement | cold start | warmed-up start | | |
|---|---|---|---|---|---|---|
| European driving test cycle | CO | g/test | 5 | 2 | 44 | 76 |
|  | CH | g/test | 4.6 | 1.6 | 9.9 | 7.0 |
|  | NO$_x$ | g/test | 2.0 | 0.4 | 14.0 | 10.3 |
| Idle running r.p.m. |  |  |  |  |  |  |
| 1900–2200 | CO | % | — | 0.4 | 1.5 | 1.6 |
| 600–900 | CO | % | — | 0.01 | 1.0 | 1.0 |

We claim:

1. A method of feeding a carburetter internal combustion engine, which comprises forming a combustible mixture from the flow of a petrol-air mixture and the flow of a hydrogen-air mixture, feeding said combustible mixture to said engine, and controlling the quantities of said mixture components depending on the load on a shaft of said engine by varying the quantity of said petrol-air mixture and the quantity of and component proportions in said hydrogen-air mixture so that resulting combustible mixture fed to said engine contains (by weight %): at a full load
  petrol—from 5.8 to 6.0
  hydrogen—from 0.14 to 0.17,
  air—from 93.7 to 94.0;
at a load constituting 0.75 of the full load
  petrol—from 4.3 to 4.7
  hydrogen—from 0.19 to 0.22
  air—from 95.2 to 95.5;
at a load constituting 0.5 of the full load
  petrol—from 3.1 to 3.2
  hydrogen—from 0.25 to 0.29
  air—from 96.4 to 96.7;
at a load constituting 0.25 of the full load
  petrol—from 1.8 to 2.0
  hydrogen—from 0.37 to 0.40
  air—from 97.6 to 97.8;
at a load constituting 0.1 of the full load
  petrol—from 1.2 to 1.5
  hydrogen—from 0.42 to 0.45
  air—from 98.1 to 98.4; and at loads lying between said values the quantities of the gasoline, hydrogen and air are varied to obtain quantities lying between said corresponding values.

* * * * *